(12) United States Patent
Park

(10) Patent No.: US 10,350,986 B2
(45) Date of Patent: Jul. 16, 2019

(54) TRANSMISSION STRUCTURE FOR VEHICLE

(71) Applicant: HYUNDAI MOTOR COMPANY, Seoul (KR)

(72) Inventor: Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 367 days.

(21) Appl. No.: 15/440,787

(22) Filed: Feb. 23, 2017

(65) Prior Publication Data

US 2018/0126839 A1 May 10, 2018

(30) Foreign Application Priority Data

Nov. 10, 2016 (KR) .................. 10-2016-0149492

(51) Int. Cl.
| | |
|---|---|
| *F16H 3/08* | (2006.01) |
| *B60K 6/547* | (2007.10) |
| *B60K 6/36* | (2007.10) |
| *B60K 6/48* | (2007.10) |
| *F16H 3/089* | (2006.01) |
| *F16H 3/10* | (2006.01) |

(52) U.S. Cl.
CPC ............... *B60K 6/547* (2013.01); *B60K 6/36* (2013.01); *B60K 6/48* (2013.01); *F16H 3/089* (2013.01); *F16H 3/10* (2013.01); *B60K 2006/4825* (2013.01); *B60Y 2200/92* (2013.01); *B60Y 2400/70* (2013.01); *F16H 2200/0039* (2013.01); *Y02T 10/6221* (2013.01); *Y02T 10/6252* (2013.01); *Y10S 903/909* (2013.01); *Y10S 903/919* (2013.01)

(58) Field of Classification Search
CPC . F16H 3/093; F16H 3/006; F16H 3/10; F16H 37/043; F16H 2003/007
USPC ............................................. 74/330, 333, 340
See application file for complete search history.

(56) References Cited

U.S. PATENT DOCUMENTS

| | | | | |
|---|---|---|---|---|
| 7,272,987 | B2 * | 9/2007 | Hughes ................... | B60K 6/36 477/5 |
| 8,979,704 | B2 * | 3/2015 | Kaltenbach ............ | B60K 6/387 180/65.7 |
| 2002/0088291 | A1 * | 7/2002 | Bowen ..................... | B60K 6/52 74/339 |

(Continued)

FOREIGN PATENT DOCUMENTS

KR      10-2012-0005101 A      1/2012

*Primary Examiner* — Ha Dinh Ho
(74) *Attorney, Agent, or Firm* — Brinks Gilson & Lione

(57) ABSTRACT

A transmission of a vehicle is provided. The transmission includes: a first input shaft receiving engine power; a second input shaft receiving motor power; an output shaft; a first stage driving gear at the first input shaft; a second stage driving gear at the second input shaft; a third stage driving gear at the second input shaft; a first synchronizing unit connecting one of the second input shaft and the first stage driving gear to the first input shaft; a second synchronizing unit connecting the second input shaft to the third stage driving gear; first and third stage driven gears engaged with the first and third stage driving gears to form shift ratios of first and third stages; and a second stage driven gear through a one-way clutch while being engaged with the second stage driving gear to form a shift ratio of second state.

5 Claims, 11 Drawing Sheets

(56) References Cited

U.S. PATENT DOCUMENTS

| | | | | |
|---|---|---|---|---|
| 2002/0177504 A1* | 11/2002 | Pels | ............... | B60K 6/36 477/3 |
| 2006/0130601 A1* | 6/2006 | Hughes | ............... | B60K 6/36 74/340 |
| 2010/0197436 A1* | 8/2010 | Ideshio | ............... | B60K 6/365 475/8 |

* cited by examiner

TRANSMISSION STRUCTURE FOR VEHICLE

CROSS-REFERENCE TO RELATED APPLICATION

This application claims priority to and the benefit of Korean Patent Application No. 10-2016-0149492, filed on Nov. 10, 2016, which is incorporated herein by reference in its entirety.

FIELD

The present disclosure relates to a transmission structure for a vehicle to reduce the number of parts and to improve fuel efficiency.

BACKGROUND

The statements in this section merely provide background information related to the present disclosure and may not constitute prior art.

An electric vehicle may run when torque generated by an electric motor driven with electricity is transferred to driving wheels of the electric vehicle.

In conventional case, driving force generated by the electric motor is decelerated by a decelerator to drive the driving wheels. In the related art, various research studies are carried out to effectively transfer driving force from the electric motor to the driving wheels so as to increase distance of travel and to improve driving performance.

However, we have discovered that when shift gears are excessively applied in order to improve the transmission efficiency, weight and volume of the transmission are increased, thereby decreasing fuel efficiency of the vehicle. Furthermore, torque interruption may be generated when the gear is shifted.

The foregoing is intended merely to aid in the understanding of the background of the present disclosure, and is not intended to mean that the present disclosure falls within the purview of the related art that is already known to those skilled in the art.

SUMMARY

Therefore, the present disclosure addresses the above problems, and the present disclosure provides a transmission structure for a vehicle configured to include shift gears i.e. three gears of an engine and two gears of a motor so as to reduce the number of parts, and weight and to improve fuel efficiency.

In accordance with one aspect of the present disclosure, the above and other objects can be accomplished by the provision of transmission structure for a vehicle. The transmission includes: a first input shaft configured to receive power from an engine, a second input shaft configured to receive power from a motor and coaxially arranged with the first input shaft, an output shaft parallel to the first input shaft and the second input shaft, a first stage driving gear disposed at the first input shaft to be freely rotatable, a second stage driving gear disposed at the second input shaft, a third stage driving gear disposed at the second input shaft to be freely rotatable, a first synchronizing unit disposed at the first input shaft to selectively connect one of the second input shaft and the first stage driving gear to the first input shaft, a second synchronizing unit disposed at the second input shaft to selectively connect the second input shaft to the third stage driving gear, a first stage driven gear and a third stage driven gear disposed at the output shaft, the first stage driven gear and the third stage driven gear engaged with the first stage driving gear and third stage driving gear to form a shift ratio of a first stage and a shift ratio of a third stage, respectively, and a second stage driven gear mounted at the output shaft through a one-way clutch, the second stage driven gear engaged with the second stage driving gear to form a shift ratio of a second state.

The transmission structure may include a clutch disposed at the second input shaft to selectively connect the third driving gear to the second input shaft.

The transmission structure may include an engine clutch being selectively connected between the engine and the first input shaft.

The one-way clutch transfers power from the second stage driven gear to the output shaft.

The first synchronizing unit may include a synchronizer, and the second synchronizing unit may include a dog clutch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
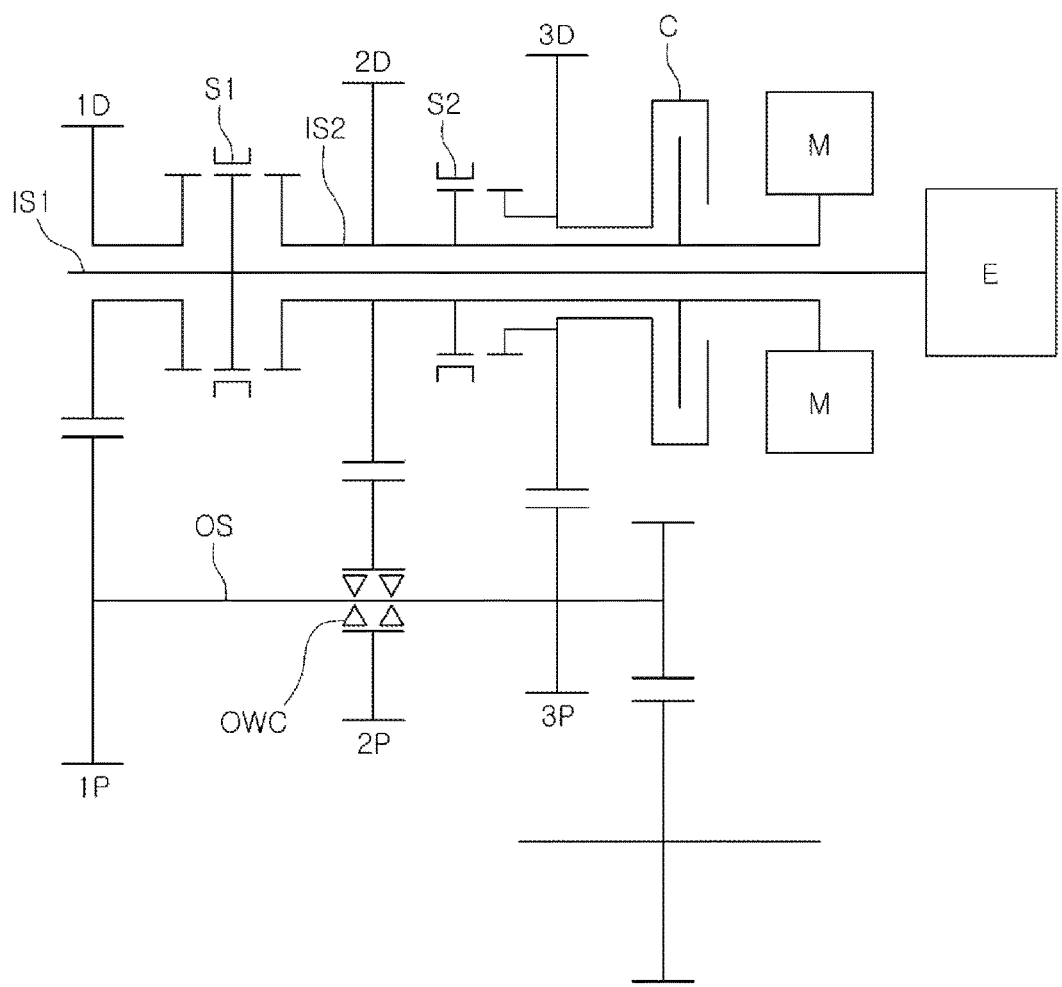
FIG. 1 is a view illustrating a transmission structure for a vehicle according to an form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a transmission structure for a vehicle of the present disclosure will be described with reference to the accompanying drawings.

FIG. 1 is a view illustrating a transmission structure for a vehicle according to one form of the present disclosure. Referring to FIG. 1, the transmission structure for the vehicle may include: a first input shaft IS1 mounted to receive power from an engine E; a second input shaft IS2 coaxially arranged with the first input shaft IS1 while being mounted to receive power from a motor M; an output shaft OS parallel to the first input shaft IS1 and the second input shaft IS2; a first stage driving gear 1D disposed at the first input shaft IS1 to be freely rotatable; a second stage driving gear 2D disposed at the second input shaft IS2; a third stage driving gear 3D disposed at the second input shaft IS2 to be freely rotatable; a first synchronizing unit S1 disposed at the first input shaft IS1 to selectively connect one of the second input shaft IS2 or the first stage driving gear 1D to the first input shaft IS1; a second synchronizing unit S2 disposed at the second input shaft IS2 to selectively connect the second input shaft IS2 to the third stage driving gear 3D; a first stage driven gear 1P disposed at the output shaft OS while being engaged with the first stage driving gear 1D to form a shift ratio of a first stage; a third stage driven gear 3P disposed at the output shaft OS while being engaged with the third stage driving gear 3D to form a shift ratio of a third stage; and a second stage driven gear 2P mounted at the output shaft through a one-way clutch while being engaged with the second stage driving gear 2D to form a shift ratio of a second state.

In the illustrated form of the present disclosure, power of the engine E and the motor M is transferred to the output shaft OS through a set of the first stage driving gear 1D and the first stage driven gear 1P, a set of the second stage driving gear 2D and the second stage driven gear 2P, or a set of the third stage driving gear 3D and the third stage driven gear 3P, in response to control of the first and second synchronizing units S1 and S2

Herein, the first synchronizing unit S1 may be a synchronizer and the second synchronizing unit may be a dog clutch.

Figure 2:
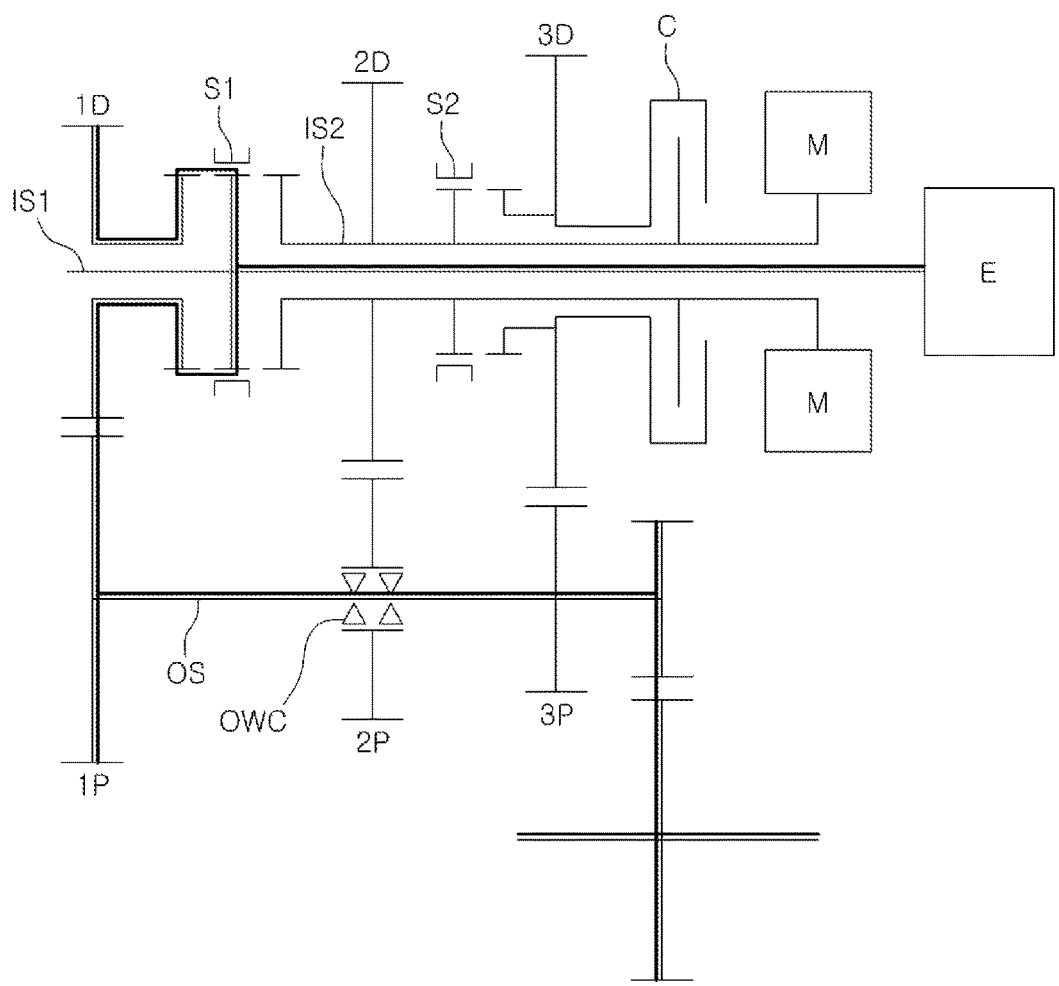
FIGS. 2 to 4 are views illustrating power flow of the transmission for the vehicle in response to gearshift during an engine drive mode.
Figure 3:
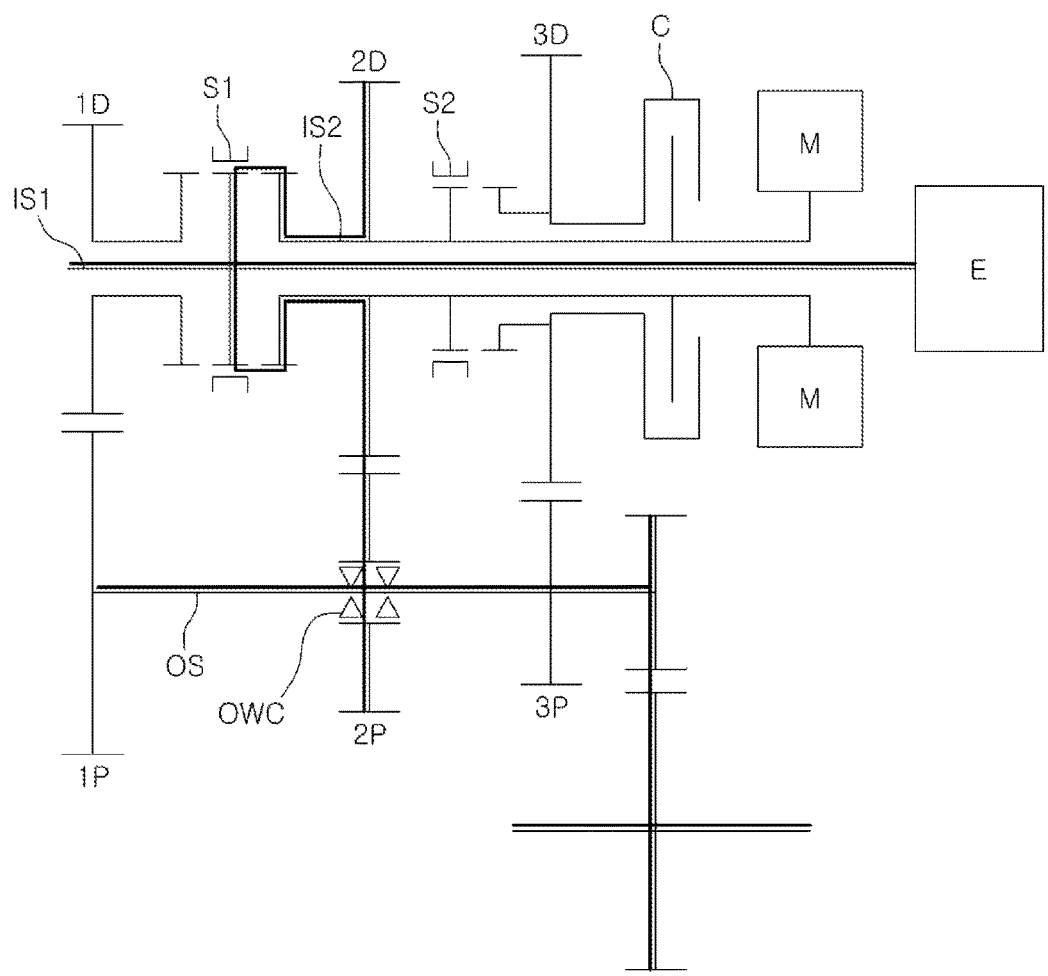
Figure 4:
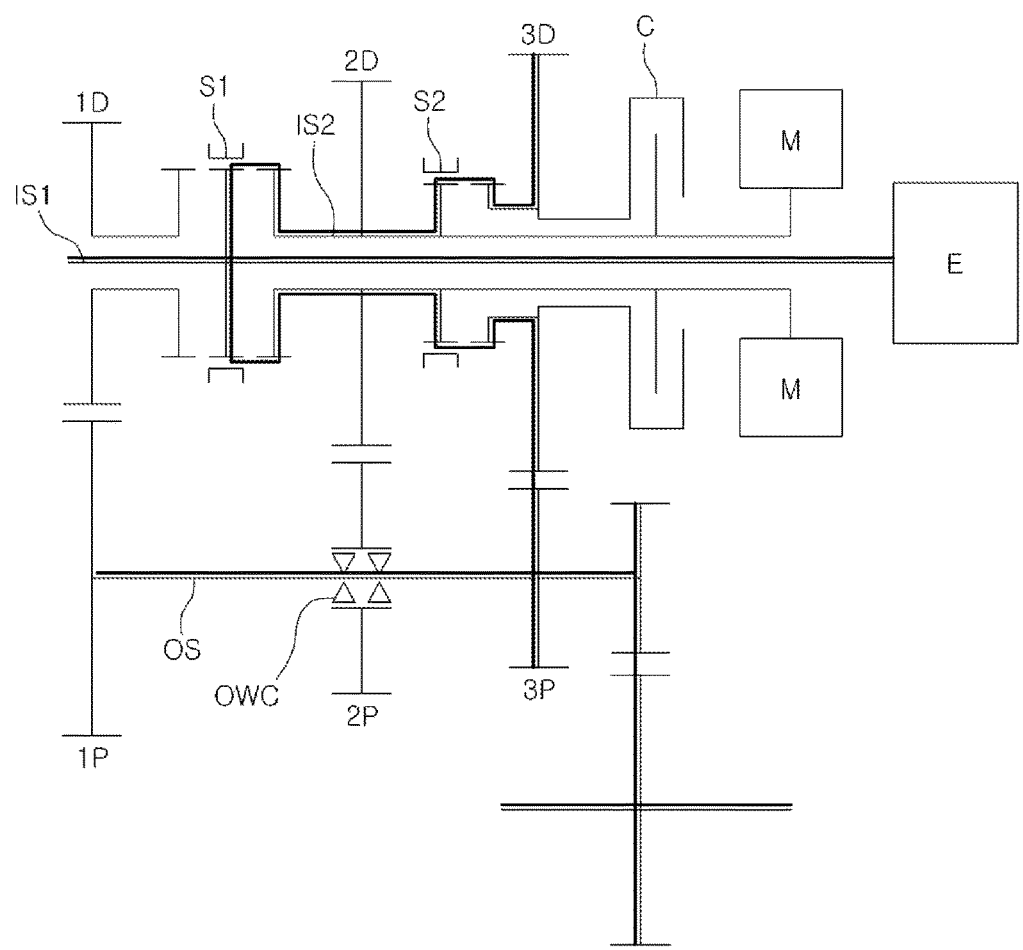

FIGS. 2 to 4 are views illustrating power flow of the transmission for the vehicle in response to gearshift during an engine drive mode.

For example, as illustrated in FIG. 2, if the vehicle travels at a first stage in the engine drive mode, the first synchronizing unit S1 is operated to connect the first input shaft IS1 to the first stage driving gear D1. Then, power of the engine E is sequentially transferred to the first input shaft IS1, the first synchronizing unit S1, the first stage driving gear 1D, the first stage driven gear 1P, and the output shaft OS. Furthermore, power of the engine E is transferred to a differential gear through an output gear disposed at the output shaft OS such that the vehicle travels at the first stage in the engine drive mode.

As illustrated in FIG. 3, if the vehicle travels at a second stage in the engine drive mode, the first synchronizing unit S1 connects the first input shaft IS1 to the second input shaft IS2 and the second synchronizing unit S2 is in neutral. Then, power of the engine E is sequentially transferred to the first input shaft IS1, the first synchronizing unit S1, the second input shaft IS2, the second stage driving gear 2D, the second stage driven gear 2P, and the output shaft OS such that the second stage of the engine E may be implemented.

As illustrated in FIG. 4, if the vehicle travels at a third stage in the engine drive mode, the first synchronizing unit S1 connects the first input shaft IS1 to the second input shaft IS2 and the second synchronizing unit S2 connects the second input IS2 to the third diving gear 3D. Accordingly, power of the engine E is sequentially transferred to the first input shaft IS1, the first synchronizing unit S1, the second input shaft IS2, the second synchronizing unit S2, the third stage driving gear 3D, the third stage driven gear 3P, and the output shaft OS such that the third stage of the engine E may be implemented.

Herein, a shift ratio of the set of the third stage driving gear 3D and the third stage driven gear 3P is formed to be lower than that of the set of the second stage driving gear 2D and the second stage driven gear 2P. Thereby, engine torque may be transferred to the output shaft OS through the third stage driving gear 3D and the third stage driven gear 3P.

In addition, the second stage driven gear 2P is connected to the output shaft OS through the one-way clutch. Accordingly, power of the engine E transferred to the output shaft OS through the third stage driven gear 3P is transferred to the second stage driven gear 2P to inhibit or prevent interlock or burning out the transmission.

To this end, the one-way clutch may be configured to transfer power from the second stage driven gear 2P to the output shaft OS.

Figure 5:
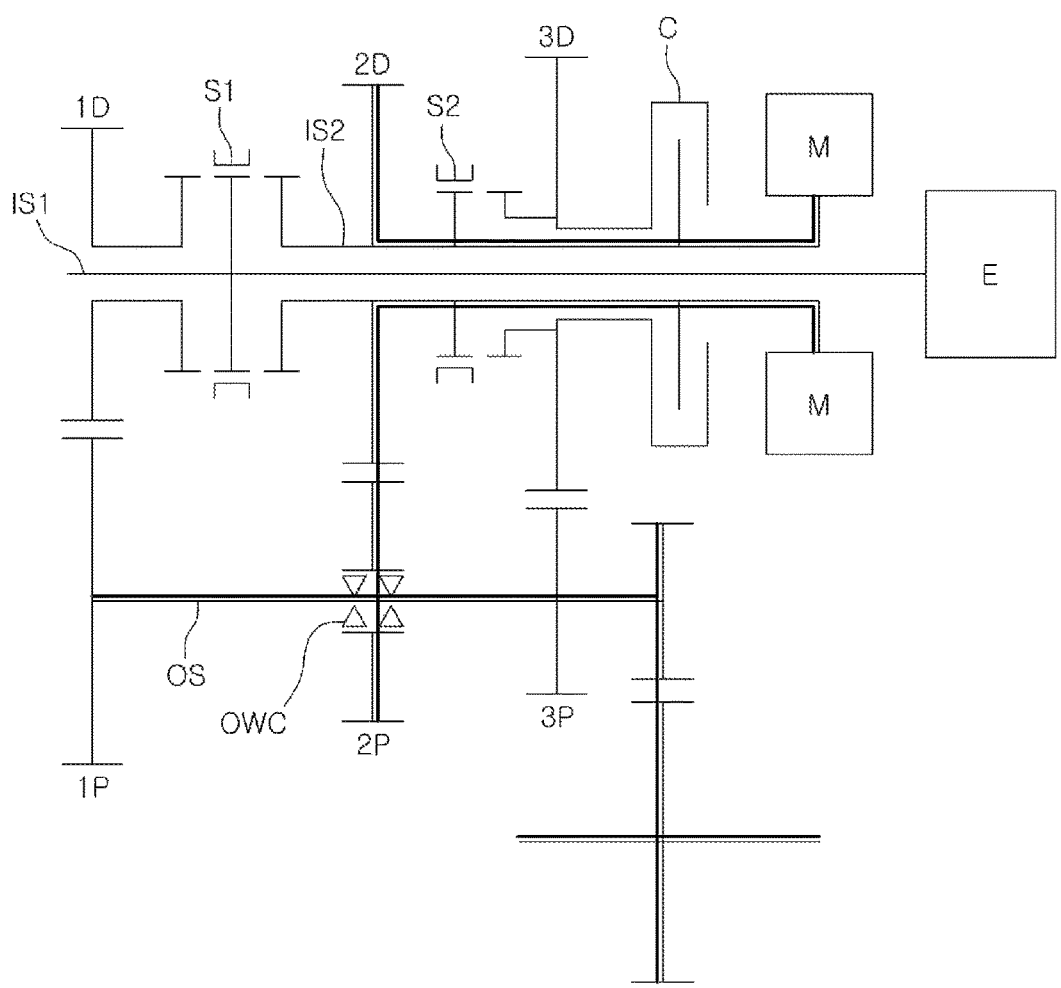
FIGS. 5 and 6 are views illustrating power flow of the transmission for the vehicle in response to gearshift during an EV mode.
Figure 6:
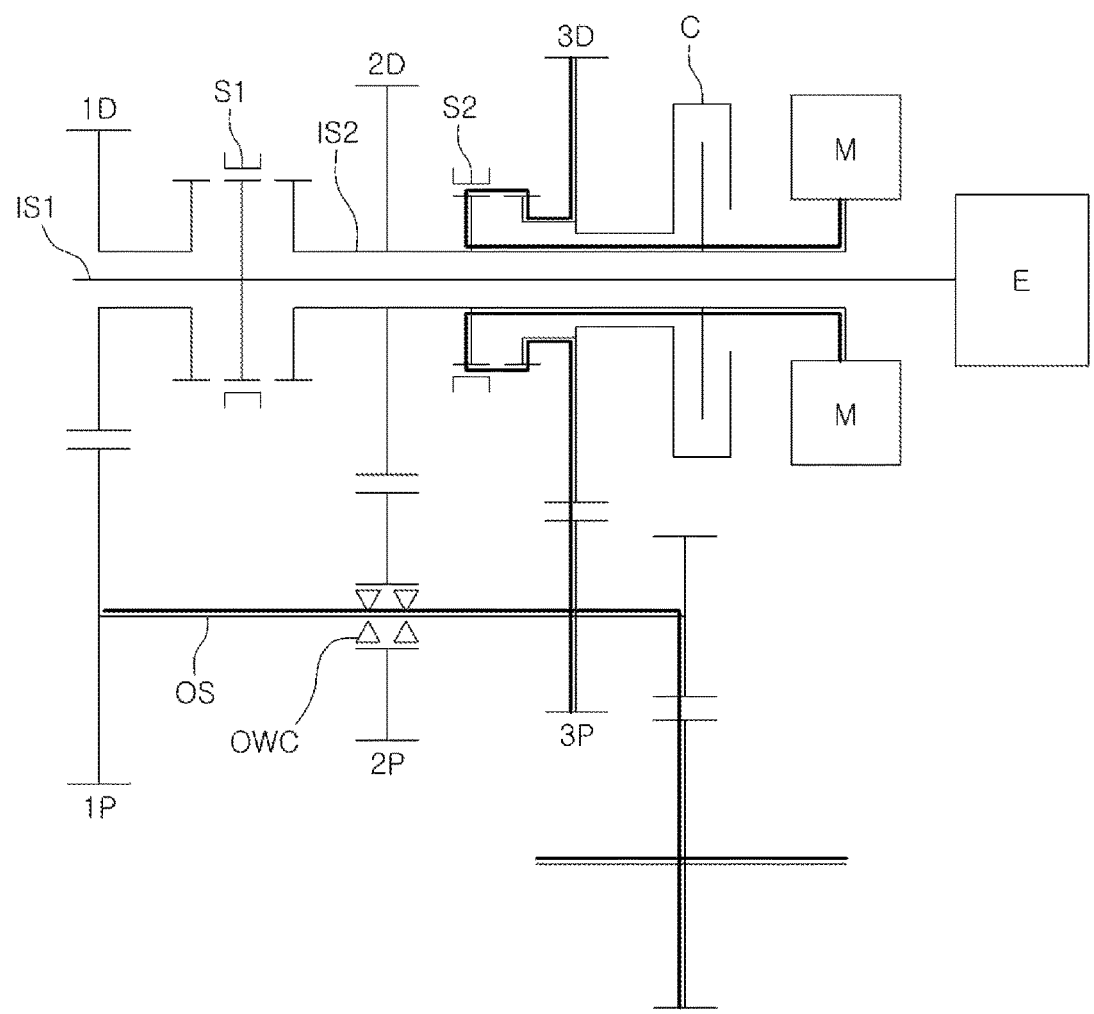

Meanwhile, FIGS. 5 and 6 are views illustrating power flow of the transmission for the vehicle in response to gearshift during an EV mode.

As illustrated in FIG. 5, if the vehicle travels at a first stage in the EV mode, the first synchronizing unit S1 and the second synchronizing unit S2 are in neutral. Namely, power of the motor M is sequentially transferred to the second input shaft IS2, the second stage driving gear 2D, the second stage driven gear 2P, and the output shaft OS. Herein, in the EV mode, the case in which power of the motor M is transferred to the driving wheels through the set of the second stage driving gear 2D and the second stage driven gear 2P is referred to as first stage drive.

FIG. 6 shows power flow in a second stage of the EV mode. The second synchronizing unit S2 connects the second input shaft IS2 and the third stage driving gear 3D. Accordingly, power of the motor M is sequentially transferred to the second input shaft IS2, the second stage driving gear 2D, the third stage driving gear 3D, the third stage driven gear 3P, and the output shaft OS such that the second stage drive mode of the motor M may be implemented. Herein, in the EV mode, the case in which power of the motor M is transferred to the driving wheels through the set of the third stage driving gear 3D and the third stage driven gear 3P is referred to as second stage drive.

FIGS. 7 to 10 are views illustrating power flow of the transmission for the vehicle in response to gearshift during an HEV mode.

Figure 7:
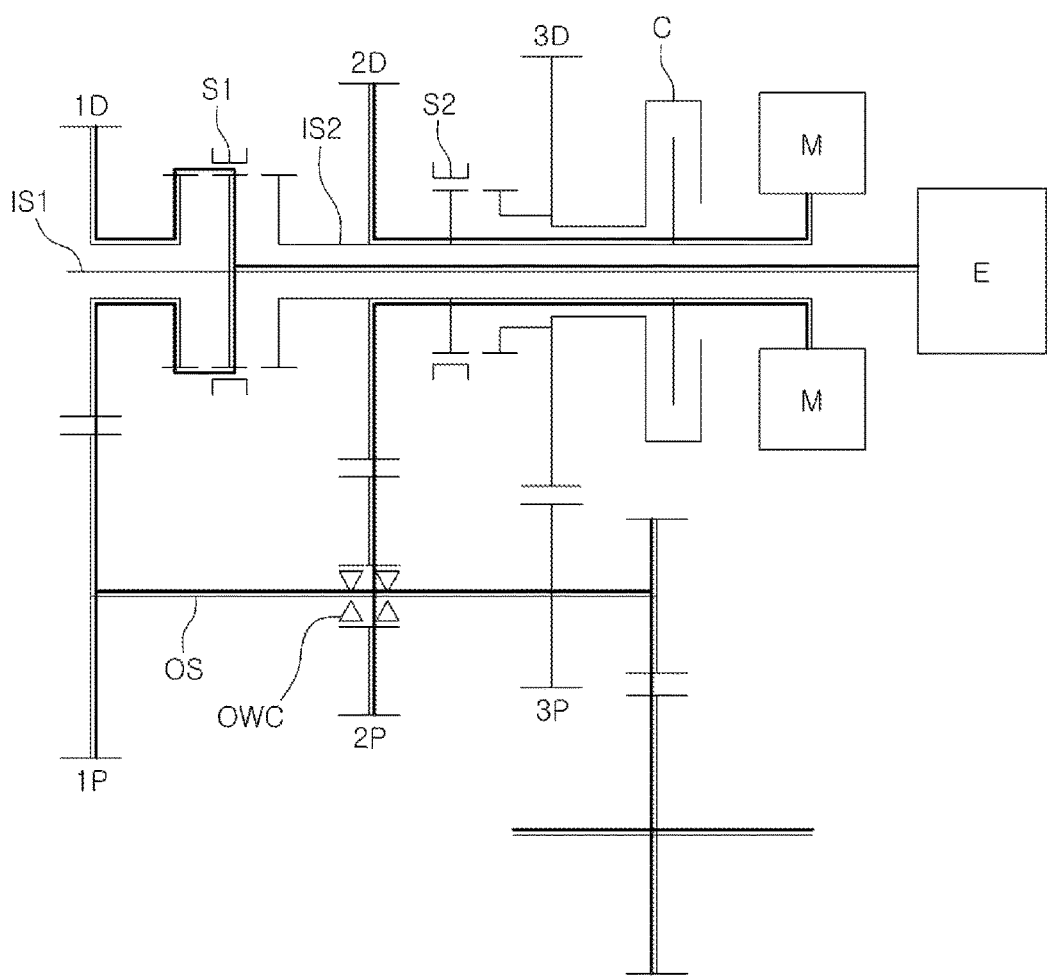
FIGS. 7 to 10 are views illustrating power flow of the transmission for the vehicle in response to gearshift during an HEV mode.

As illustrated in FIG. 7, in order to implement the engine first stage and the motor first stage, the first synchronizing unit S1 may connect the first input shaft IS1 and the first stage driving gear 1D. Accordingly, power of the engine E is transferred to the output shaft OS through the first stage gear set and power of the motor M is transferred to the output shaft OS through the second gear set, such that the gearshift mode of the engine first stage and the motor first stage may be implemented.

Figure 8:
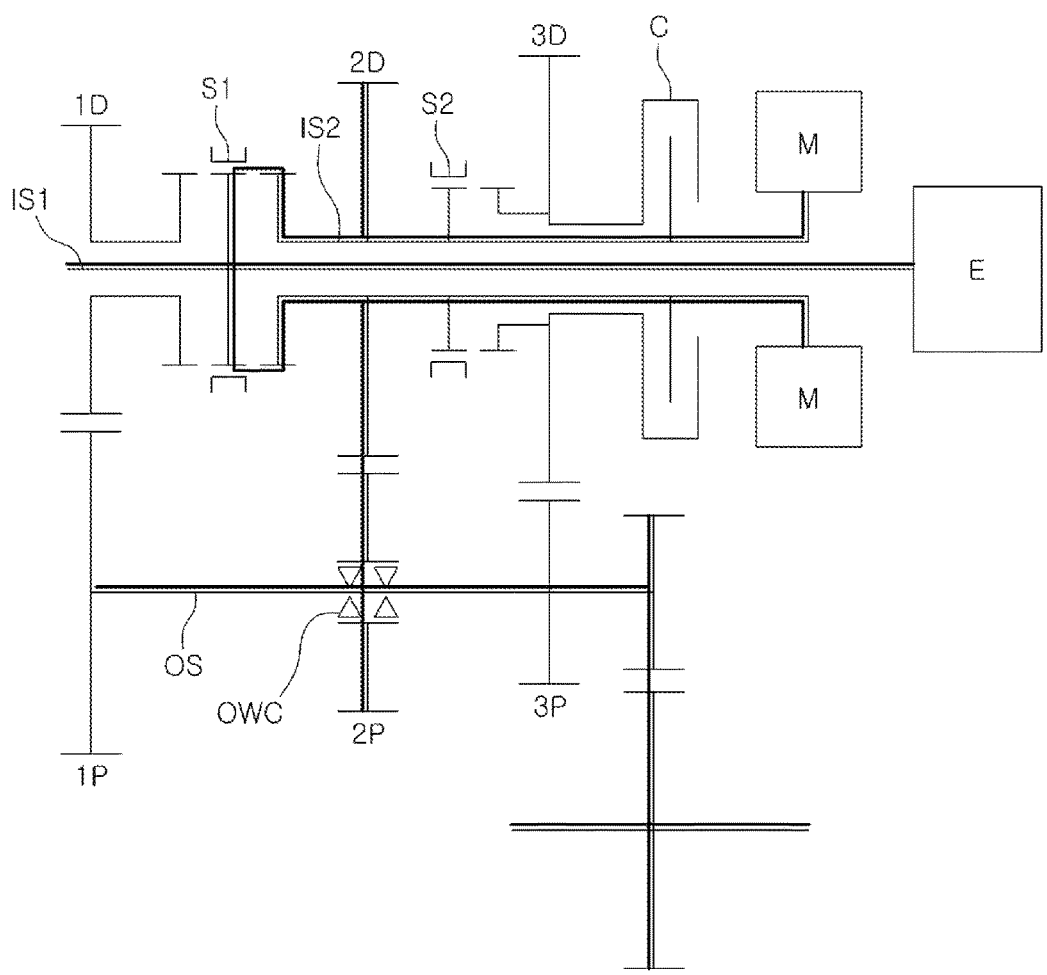

Next, the gearshift mode for the engine second stage and the motor first stage may be performed. As illustrated in FIG. 8, the first synchronizing unit S1 connects the first input shaft IS1 to the second input shaft IS2. Accordingly, power of the engine E and the motor M is transferred to the output shaft OS through the second stage gear set. Thereby, the gearshift mode for the engine second stage and the motor first stage may be implemented.

Figure 9:
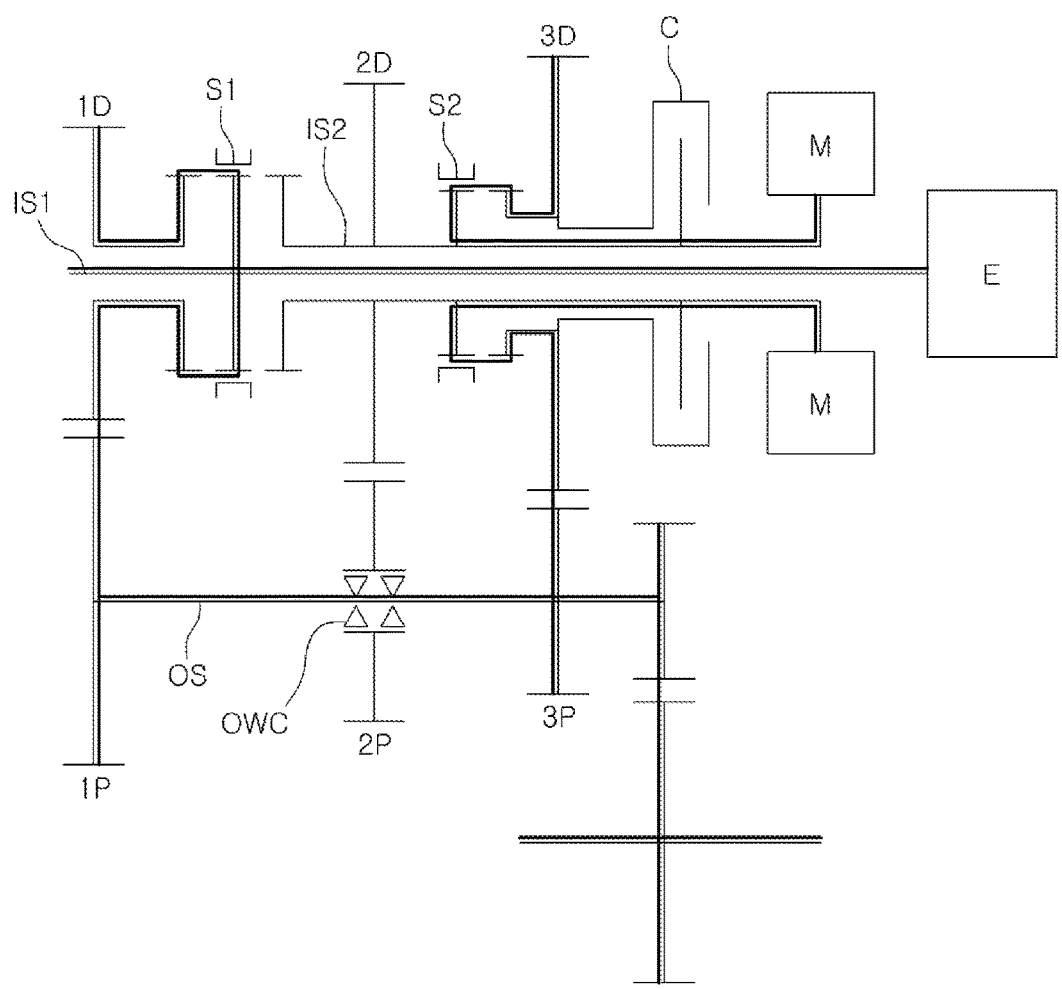

FIG. 9 shows a gearshift mode of the engine first stage and the motor second stage. Herein, the first synchronizing unit S1 connects the first input shaft IS1 and the first stage driving gear 1D and the second synchronizing unit S2 connects the second input shaft IS2 and the third stage driving gear 3D. Accordingly, power of the engine E is transferred to the output shaft OS through the first stage gear set and power of the motor M is transferred to the output shaft OS through the third stage gear set, such that gearshift mode of the engine first stage and the motor second stage may be implemented.

Figure 10:
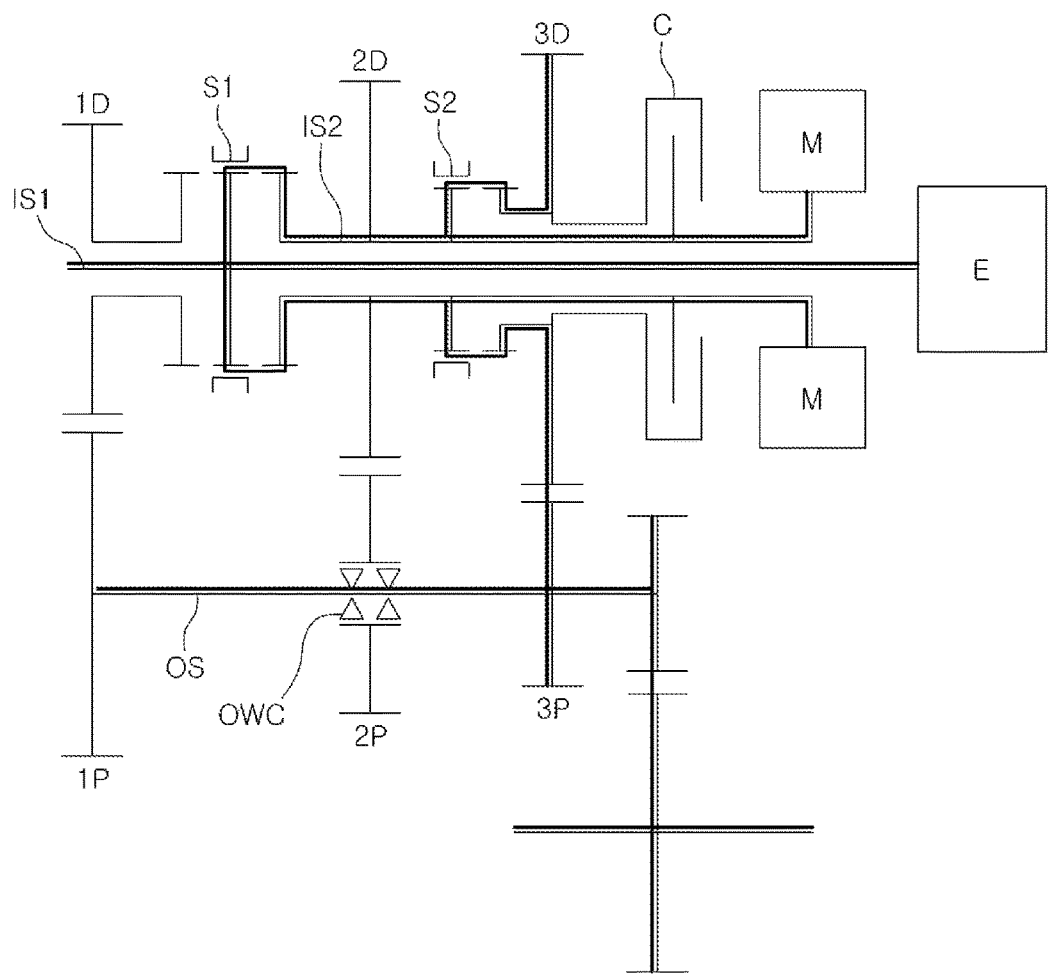

FIG. 10 shows gearshift mode for the third stage of the engine E and the second stage of the motor M. More specifically, the first synchronizing unit S1 connects the first input shaft IS1 to the second input shaft IS2 and the second synchronizing unit S2 connects the second input shaft IS2 to the third stage driving gear 3D. Accordingly, power of the engine E and the motor M is transferred to the output shaft OS through the third stage gear set, such that gearshift mode of the third stage of the engine E and the second stage of the motor M may be implemented.

As described above, the transmission for the vehicle according to the present disclosure may implement various gearshift modes, such that vehicle performance may be implemented corresponding to various driving conditions. Thereby, vehicle marketability may be improved.

Meanwhile, according to the present disclosure, a clutch C is disposed at the second input shaft IS2 so as to selectively connect the third driving gear 3D to the second input shaft IS2.

The clutch inhibits or prevents torque interruption i.e. feeling of cutting off power upon shifting from the first stage drive mode to the second stage drive mode in the EV mode of the vehicle.

Namely, the first stage of the motor M is performed by the second stage gear set and then frictional force of the clutch C is gradually increased such that power of the motor M transferred to the output shaft through the second stage gear set is induced to be transferred to the output shaft through the third stage gear set. Herein, since a shift ratio of the third stage gear set is lower than that of the second stage gear set, motor torque is gradually transferred to the third stage driving gear 3D. Then, the second synchronizing unit S2 connects the second input shaft IS2 to the third stage driving gear 3D such that power of the motor is transferred to the third stage gear set. Sequentially, the clutch C is released such that torque interruption may be inhibited or prevented.

Figure 11:
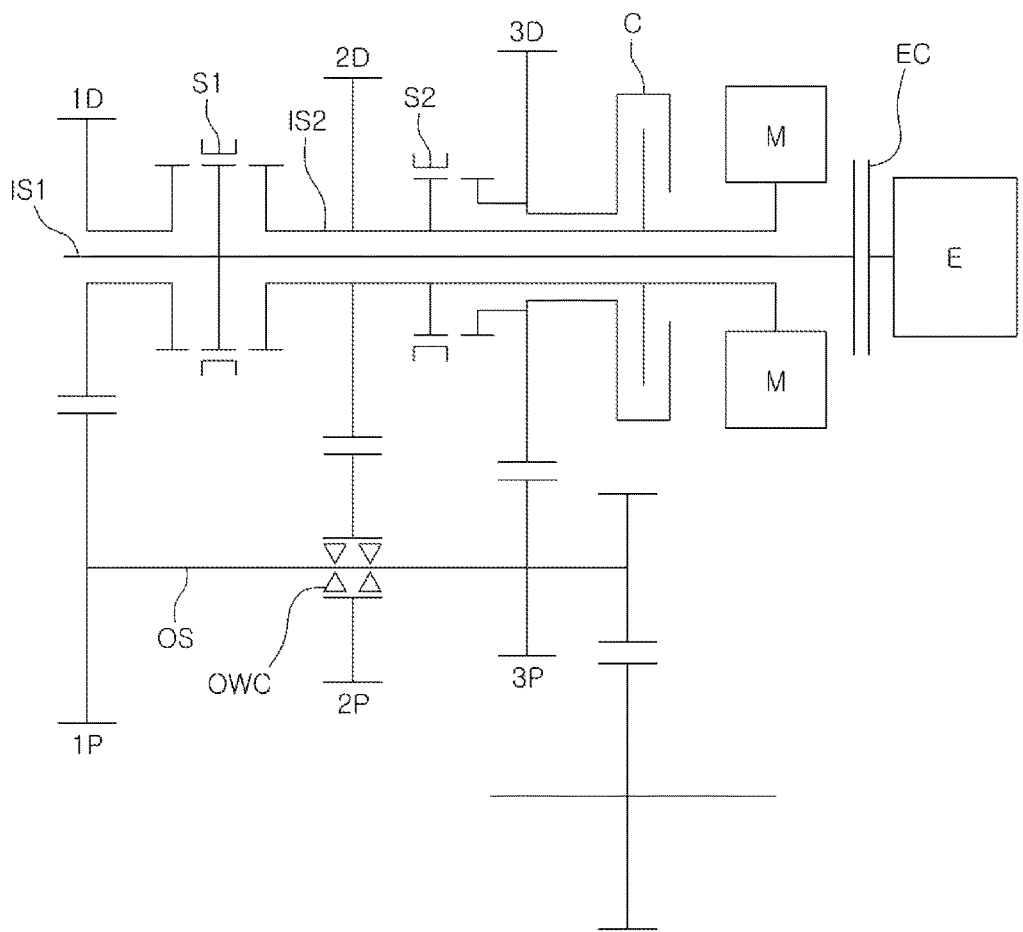
FIG. 11 is a view illustrating a transmission structure for a vehicle according to another form of the present disclosure.

FIG. 11 is a view illustrating a transmission for a vehicle according to another form of the present disclosure. Referring to FIG. 11, an engine clutch EC for selectively connecting the engine E to the first input shaft IS1 may be further provided. Accordingly, upon operation of the first synchronizing unit S1, generation of impact may be inhibited or prevented.

According to the transmission structure including the above-described structure for the vehicle, the number of parts of the transmission may be reduced, thereby being lightweight and improving fuel efficiency.

Furthermore, when shifting to the EV mode of the vehicle, torque interruption may be inhibited or prevented, thereby inhibiting shift impact.

As is apparent from the above description, the number of parts of the transmission may be reduced such that weight reduction of the transmission may be significant. Thereby, fuel efficiency of the vehicle may be improved.

Furthermore, generation of torque interruption may be inhibited or prevented while shifting to the EV mode of the vehicle, thereby inhibiting or preventing generation of shifting shock.

Although the exemplary forms of the present disclosure have been described above with reference to the accompanying drawings, those skilled in the art will appreciate that the present disclosure can be modified in various other forms without departing from the technical ideas or features thereof.

What is claimed is:

1. A transmission structure for a vehicle comprising:
   a first input shaft configured to receive power from an engine;
   a second input shaft coaxially arranged with the first input shaft, the second input shaft configured to receive power from a motor;
   an output shaft parallel to the first input shaft and the second input shaft;
   a first stage driving gear disposed at the first input shaft to be freely rotatable;
   a second stage driving gear disposed at the second input shaft;
   a third stage driving gear disposed at the second input shaft to be freely rotatable;
   a first synchronizing unit disposed at the first input shaft and configured to selectively connect one of the second input shaft and the first stage driving gear to the first input shaft;
   a second synchronizing unit disposed at the second input shaft and configured to selectively connect the second input shaft to the third stage driving gear;
   a first stage driven gear and a third stage driven gear disposed at the output shaft, the first stage driven gear and the third stage driven gear engaged with the first stage driving gear and third stage driving gear to form a shift ratio of a first stage and a shift ratio of a third stage, respectively; and
   a second stage driven gear mounted at the output shaft through a one-way clutch, the second stage driven gear engaged with the second stage driving gear to form a shift ratio of a second state.

2. The transmission structure according to claim 1, further comprising a clutch disposed at the second input shaft and configured to selectively connect the third driving gear to the second input shaft.

3. The transmission structure according to claim 1, further comprising an engine clutch configured to selectively connect the engine to the first input shaft.

4. The transmission structure according to claim 1, wherein the one-way clutch is configured to transfer power from the second stage driven gear to the output shaft.

5. The transmission structure according to claim 1, wherein the first synchronizing unit includes a synchronizer; and the second synchronizing unit includes a dog clutch.

* * * * *